Aug. 14, 1951 D. R. BALLARD 2,563,810
TIRE CARRIER SUPPORT
Filed March 25, 1949
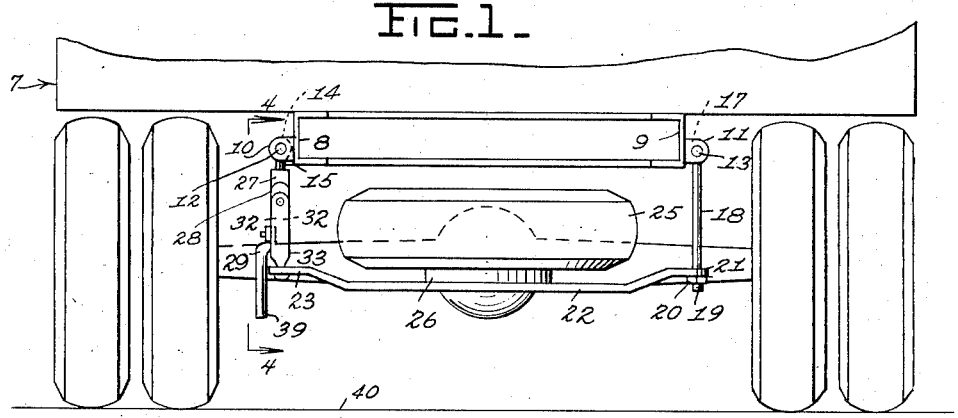
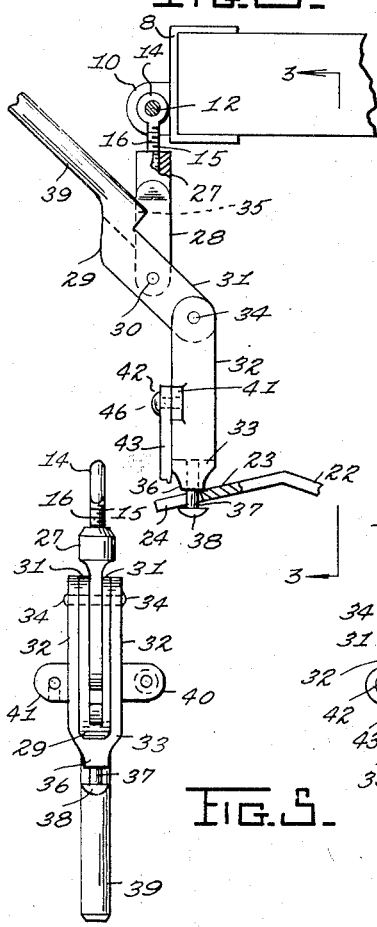
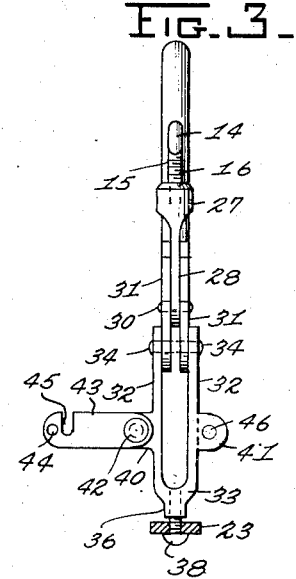
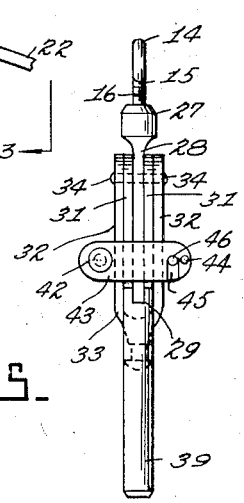
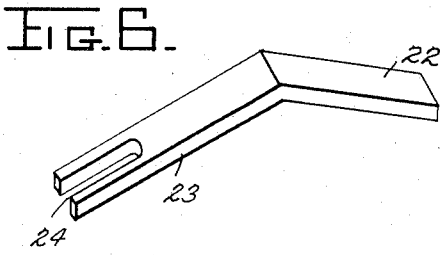
INVENTOR.
DANA R. BALLARD
BY
McMorrow, Berman & Davidson
ATTORNEYS Patented Aug. 14, 1951

2,563,810

UNITED STATES PATENT OFFICE 2,563,810

TIRE CARRIER SUPPORT

Dana R. Ballard, Madera, Calif.

Application March 25, 1949, Serial No. 83,429

2 Claims. (Cl. 224—42.12)

This invention relates to attachments for truck and pick-up carriers, and particularly to a manually-operated tire carrier attachment.

The main object of my invention is to provide a truck or pick-up carrier with quickly and conveniently-operated means for releasing a spare tire therefrom at will.

Another object is to have a tire carrier attachment of the character indicated provided with a manually-operated lever serving to dispose the tire involved in releasing position ready for removal from the carrier.

A further object is to have such a tire carrier attachment in which the manually-operated lever forms part of a tire-suspension system and which, upon being operated, lowers the tire to be removed from a normal raised position to a low position in which the carrier may be opened and the tire removed.

It is also an object to have an attachment for a tire carrier of this type which requires a minimum of reconstruction of standard tire-carrier equipment, and thus is simple to install and yet effective in use.

Other objects and advantages of the invention will appear in further detail as the specification proceeds.

In order to facilitate ready comprehension of this invention for a proper appreciation of the salient features thereof, the invention is illustrated on the accompanying drawing forming part hereof, and in which:

Figure 1 is an elevation of a manually-operated attachment for a tire carrier made according to the invention and embodying the same in a practical form, the attachment being shown in normally-locked position with the carrier supporting a spare tire beneath the rear of a truck indicated in broken lines;

Figure 2 is a fragmentary elevation of the left end of the tire carrier attachment of Figure 1 on a larger scale and in released position;

Figure 3 is a side elevation of the operating parts of Figure 2, as seen from the right, on line 3—3 of the latter figure;

Figure 4 is another side elevation as seen on line 4—4 in Figure 1, but on a larger scale;

Figure 5 is another enlarged elevation which is the reverse of that seen in Figure 4;

Figure 6 is a fragmentary perspective view of the bifurcated end of a tire-supporting cross-bar, also shown in Figures 1, 2 and 3.

In the various views the same reference numerals indicate the same or like parts.

To all who are familiar with trucks and pick-ups, it is well known that spare tires and wheels for the trucks involved are bulky and heavy, and that standard equipment for carrying such spare tires and wheels is sufficiently rugged to withstand the jars and shocks of the road to prevent loss of the tire or wheel carried as a spare. However, such equipment is not quickly or easily unlocked in order to release the spare but requires time and hard work to effect a complete release of the spare tire or wheel for replacing the tire that has blown or become seriously damaged. This is true, despite the fact that in many places and on many occasions, it may be required that a tire should be replaced quickly, as for example, on bridges and in tunnels, special traffic lanes and the like, so that obviously a pressing need for such a convenient tire carrier is obvious. I am, of course, aware that various structures have been proposed, but as yet nothing appears to have been generally adopted for this purpose.

Upon considering this problem, it has occurred to me that certain radical changes can be made in standard equipment to completely alter the operation thereof for convenient release of a spare, and as a result I have succeeded in producing a quickly-operated tire carrier, as will now be more fully described as involving a manual attachment therefor.

Hence, referring again to the drawing, beneath the rear end of a truck, generally indicated at 7, are bolted or secured a pair of opposite channels 8 and 9 spaced apart and having upon their outer sides two pairs of oppositely-outwardly-extending ears or pivot lugs 10 and 11 through which a pair of pivot pins 12 and 13 extend tranversely in parallel horizontal directions. Between the ears or lugs 10 is located the upper eye portion or end 14 of an eye bolt 15 which is threaded along the shank 16 thereof, this shank being of limited length. Between the other ears or lugs 11 is located the upper end or eye portion 17 of a conventional eye bolt 18 which is relatively long in contrast with the threaded shank 16 of the other eye bolt, and is threaded at the lower end 19 and provided with a nut 20 supporting one end 21 of a more or less conventional spare-supporting cross-bar 22 which at the other end 23 is bifurcated by an end slot 24. The cross bar 22 is adapted to support a spare 25 in substantially horizontal position by its hub 26 when located in normal horizontal supporting position.

Referring now more specifically to the attachment embodying the invention, upon threaded shank 16 of eye bolt 15 is screwed an upper internally-threaded boss 27 of a link 28 which is substantially flat below the upper boss or hub 27. Upon the lower end of link 28 is pivoted a manual lever 29 by means of a pivot pin 30 which extends through two coextensive tongues 31 forming the ends of lever 29. The mentioned tongues 31 are spaced a sufficient distance apart to receive the flat portion of link 28 between them and allow lever 29 to swivel on pivot pin 30. The other end of lever 29 is formed into an offset handle 39 by which to operate the lever. To the extreme ends of flat tongues 31 are pivoted the upper ends of the two limbs 32, 32 of a U-shaped yoke 33 by means of a pair of pivot pins 34, 34. At the inner end the handle 39 is either cut away or slotted at 35 to provide clearance for link 28 and allow the handle to be raised into its highest position shown in Figure 2, when swinging the handle and lever 29 about pivot pin 30.

At the lower end, yoke 33 terminates in an internally-threaded hub 36 into which extends rigidly an upwardly-directed bolt or screw 37 having the head 38 thereof directed downward in such fashion as to be spaced a short distance below the hub 36. The purpose of bolt 37 and its downwardly-spaced head 38 is to allow the bolt shank to enter the slot 24 of the bifurcated end 23 upon cross-bar 22 with head 38 disposed beneath the cross-bar end 23 in position to support the same.

It is, of course, understood that slot 24 is of just sufficient width to allow bolt 37 to slide into the same while preventing the head 38 of the bolt from passing upwardly through the slot.

Thus far described, the device is shown in the raised and locked position of Figures 1, 4 and 5 and serves to support the bifurcated end 23 of cross-bar 22 in raised position wherein the crossbar supports the spare 25 in its normal storage position when the intermediately-located pivot pin 30 extending through tongues 31 of lever 29 is disposed below pivots 34 in such fashion that the tongues 31 extend upwardly from pivot pin 30 toward the mentioned pivots 34, with handle 39 depending downwardly. If the mentioned handle is swung outwardly away from spare 25 and from yoke 33, and then upwardly to the position illustrated in Figures 2 and 3, tongues 31 will be partly inverted so that pivot pin 30 is brought up to a higher level than pivots 34 which thereby lowers yoke 33 with its arms 32 and brings down the end 23 of cross-bar 22 into a lowered inclined position, as best seen in Figure 2. In this position, it is a relatively simple matter to manually swing yoke 33 clockwise toward the left so that head 38 and bolt 37 swing clear of bifurcated end 23 of the cross-bar and slot 24 therein, allowing the cross-bar to drop to the ground 40 beneath the truck, when the spare 25 is easily accessible to be immediately dislodged from the cross-bar if the dropping of the latter has not already caused the spare to roll off and lie upon the ground. When the damaged tire or wheel which the spare replaces is to be deposited on the cross-bar 22, this is also easily performed by merely rolling the spare to the cross-bar and then allowing it to tip over into inclined position upon the crossbar, when end 23 of said cross-bar may be raised sufficiently by a hand or by any means conveniently accessible to a level allowing bolt 37 to be slid into slot 24 in bifurcated end 23 with head 38 immediately beneath the bifurcated end. Thereafter, by manually swinging handle 39 downwardly in counter-clockwise direction, lever 29 will be sufficiently inverted to raise yoke 33 and superpose the arms 32 thereof upon the tongues 31 of lever 29 with the tongues and the arms substantially coextensive and handle 39 depending directly downward, as best seen in Figure 1. As pivots 34 are then directly above pivot 30, the attained position is substantially balanced so that there is no actual tendency for lever 29 to swing back again in clockwise direction to lower the crossbar 22.

However, as vibration might cause the handle to swing back again as just mentioned, means are included to lock the handle and the operating lever in attained raised position of the cross-bar in order to ensure that the latter remains thus until a spare is to be removed therefrom. Thus, upon the outer edges of both arms 32 of yoke 33 are fixed a pair of oppositely-directed lugs 40, 41. Upon lug 40 is fixed a headed pin 42 upon which is pivotally mounted a swingable latch member 43 having a pin 44 disposed upon its outer end by which to manipulate the latch member and immediately within the mentioned pin 44 is a slot 45, adapted to straddle a corresponding rigid pin fixed at 46 upon the other lug 41. When latch member 43 is swung clockwise, as best seen in Figure 3, from the position shown in that figure to that shown in Figure 4, the latch member locks the tongues 31 of lever 29 within yoke arms 32 and prevents handle 39 from being raised from the position shown in Figures 1, 4 and 5. When the finger piece 44 is seized and latch member 43 swung counter-clockwise about its pivot pin 42 into the position shown in Figure 3, it will be possible to raise handle 39, inasmuch as the latch member then leaves lever 29 clear to swing out from between the arms 32 of yoke member 33. It is thus evident that when the handle is in its lowest position, and the lever tongues 31 housed within the outline of yoke arms 32, the latch member in its locked position engaging the slot 45 thereof upon pin 46 will effectively hold lever 29 in locked condition, preventing the lever from lowering end 23 of the cross-bar until the latch is deliberately opened.

Manifestly, variations may be resorted to and parts and features may be modified or used without others within the scope of the amended claims.

Having now fully described my invention, I claim:

1. A device, comprising a support, a vertically swinging member having one end pivotally connected with the support and provided at its opposite end with a slot which extends through such opposite end, a first link pivotally connected with the support and including a single layer, a lever including spaced opposed longitudinal sides, the layer being arranged between the sides, a pin pivotally connecting the end of the layer with the sides at a point adjacent to the longitudinal center of the sides, a second link including spaced longitudinal sides receiving between them the sides of the lever, pivot means connecting the ends of the sides of the second link and the ends of the sides of the lever, a headed pin secured to the free end of the second link to be removably inserted within the slot of the swinging member, and a latch pivotally mounted upon one side of the second link and to be shifted to a position in advance of the sides of the lever when the lever is in the closed position, the lever extending beyond the free end of the second link when the lever is in the closed position.

2. A device, comprising a relatively stationary member, a second member to be moved toward the relatively stationary member, a first link pivotally connected with the relatively stationary member and including a single layer, a lever including spaced opposed longitudinal sides, the single layer being arranged between the sides, a pin pivotally connecting the end of the single layer and the sides near the longitudinal center of the sides, a second link including spaced longitudinal sides receiving the lever sides between them, pivot means connecting the ends of the sides of the second link and the ends of the lever sides, means connecting the end of the second link with the second member, and the latch pivotally connected with one side of the second link and movable to a position in front of the lever sides, the lever extending longitudinally beyond the second link when the lever is in the closed position.

DANA R. BALLARD.

REFERENCES CITED

The following references are of record in the file of this patent:

UNITED STATES PATENTS

| Number | Name | Date |
| --- | --- | --- |
| 1,334,997 | Grenard | Mar. 30, 1920 |
| 1,382,322 | Schleicher | June 21, 1921 |
| 1,421,573 | Schaefer | July 4, 1922 |
| 2,449,544 | Ballard | Sept. 21, 1948 |